United States Patent [19]

Kerr et al.

[11] Patent Number: 5,009,873

[45] Date of Patent: Apr. 23, 1991

[54] CRYSTAL MODIFICATION IN WET PROCESS PHOSPHORIC ACID PRODUCTION

[75] Inventors: E. Michael Kerr, Naperville; Lawrence J. Connelly, Oak Lawn, both of Ill.; William J. Roe, Roswell, Ga.; Robert M. Vallowe, Brandon, Fla.

[73] Assignee: Nalco Chemical Company, Naperville, Ill.

[21] Appl. No.: 471,778

[22] Filed: Jan. 29, 1990

[51] Int. Cl.$^5$ .................. G01B 25/16; C01F 11/46
[52] U.S. Cl. ................... 423/320; 423/166; 423/167; 423/266; 423/555
[58] Field of Search ............ 423/266, 320, 555, 166, 423/167

[56] References Cited

U.S. PATENT DOCUMENTS

| | | | |
|---|---|---|---|
| 2,044,942 | 6/1936 | Heckert | 423/555 |
| 4,140,748 | 2/1979 | Ore | 423/167 |
| 4,291,005 | 9/1981 | Poulos et al. | 423/320 |
| 4,314,978 | 2/1982 | Franklin | 423/555 |
| 4,332,779 | 6/1982 | Thibodeau | 423/321 |
| 4,581,156 | 4/1986 | Chatham | 252/321 |
| 4,800,071 | 1/1989 | Kaesler et al. | 423/321 |

Primary Examiner—Wayne A. Langel
Attorney, Agent, or Firm—Joan I. Norek; Robert A. Miller; Donald G. Epple

[57] ABSTRACT

A wet process production of phosphoric acid in which phosphate rock is digested, whereby phosphoric acid is released and calcium sulfate crystals are formed, employs a polymeric crystal modifier in the digestion stage of the process to improve the separation of the raw phosphoric acid product from the calcium sulfate crystals and to increase the concentration of phosphoric acid in the raw phosphoric acid product.

19 Claims, No Drawings

CRYSTAL MODIFICATION IN WET PROCESS PHOSPHORIC ACID PRODUCTION

TECHNICAL FIELD OF THE INVENTION

The present invention is in the technical field of the wet process production of phosphoric acid and additives therefor, and in particular the present invention is in the technical field of calcium sulfate crystal modifiers employed in the wet process phosphoric acid production process.

BACKGROUND OF THE INVENTION

Phosphoric acid is generally manufactured or produced by the digestion of phosphate rock with concentrated sulfuric acid in a slurry of recycled phosphoric acid. Phosphate rock contains tricalcium phosphate. During such digestion, calcium sulfate is precipitated and phosphoric acid is released. This digestion or decomposition is referred to as the attack or digestion stage or circuit of the process. During the digestion circuit, calcium sulfate crystals are nucleated and grow. The digestion circuit is followed by a separation stage to remove calcium sulfate and other impurities from the phosphoric acid. Such separation is generally by filtration. The efficiency of such separation process is significantly dependent upon the calcium sulfate crystals that have been produced in the attack tank.

The wet process phosphoric acid production is a commercially important process. The phosphoric acid produced thereby is an important raw material for the manufacture of phosphates for the fertilizer industry, and has other commercial uses. It is of great economic benefit to increase the efficiency of the wet process phosphoric acid production. Towards such end the modification of the calcium sulfate crystals in such a manner that the filtration is improved is extremely desirable in this field. Also extremely desirable is any increase in the percentage of phosphoric acid obtained from the phosphate rock during the digestion circuit.

DISCLOSURE OF THE INVENTION

The present invention is a process for the production of phosphoric acid using the wet process method wherein a crystal modifier is added to the digestion circuit or digestion phase of the wet process so as to be present during the crystal nucleation phase of the process, whereby the subsequent filtration is improved and the yield of phosphoric acid is increased. The crystal modifier is a polymer containing monomer units of the following Formula I:

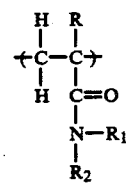

Formula I wherein R is hydrogen or methyl and $R_1$ and $R_2$ are independently hydrogen, alkyl or sulfoalkyl substituents. In preferred embodiment the crystal modifier is a polymer containing monomer units of two types, one of which is of the Formula I above wherein both of $R_1$ and $R_2$ are hydrogen, and the other of which is of the Formula I wherein one of $R_1$ and $R_2$ is a sulfoalkyl substituent. The polymeric crystal modifier is added in its water-soluble salt form, including the alkali metal, amine and ammonium salt forms of the polymer. The polymer is of relatively high molecular weight and in further preferred embodiment has a specific balance between the proportion of the polymer that contains the sulfoalkyl substituent to amide nitrogen and the units without such sulfoalkyl substituent, which is described in detail below.

PREFERRED EMBODIMENTS OF THE INVENTION

Phosphate rock is generally obtained by open pit mining followed by various beneficiation steps to increase the phosphate content and reduce the particle size before it is fed to the phosphoric acid production plant. In addition to calcium phosphate, phosphate rock typically contains a number of other substances, including organic matter, iron and aluminum oxides, silica, calcium and magnesium carbonates, sulfates and chlorides. Phosphate rock may also contain sodium, potassium, zinc, manganese, arsenic, uranium, chromium, vanadium, and molybdenum. The phosphate rock composition will vary depending on the source and the beneficiation steps employed.

The digestion or decomposition of the calcium phosphate of the phosphate rock generally proceeds by the following reaction:

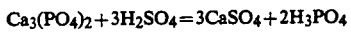

$$Ca_3(PO_4)_2 + 3H_2SO_4 = 3CaSO_4 + 2H_3PO_4$$

In the above reaction equation, the calcium sulfate by-product is shown as the anhydrite form and under certain conditions the wet process does produce the anhydrite form of calcium sulfate, and such process is often referred to as the anhydrite process. The wet process phosphoric acid production most commonly used commercially is referred to as the gypsum or dihydrate process wherein the calcium sulfate by-product is produced in its dihydrate form as follows:

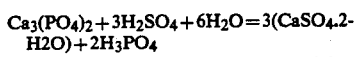

$$Ca_3(PO_4)_2 + 3H_2SO_4 + 6H_2O = 3(CaSO_4 \cdot 2H_2O) + 2H_3PO_4$$

Under a third set of reaction conditions, referred to as the hemihydrate process, it is the hemihydrate form of calcium sulfate that is produced as the by-product, as follows:

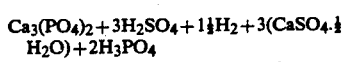

$$Ca_3(PO_4)_2 + 3H_2SO_4 + 1\tfrac{1}{2}H_2 + 3(CaSO_4 \cdot \tfrac{1}{2}H_2O) + 2H_3PO_4$$

As seen from the above reaction equations, the digestion is accomplished with sulfuric acid. In practice, particularly for commercial facilities, phosphoric acid is also employed to accomplish the digestion. The phosphoric acid assists in breaking down the phosphate rock and in providing a low pH condition, and the phosphoric acid used is generally recycled phosphoric acid which is a by-product of the separation stage of the wet process. The use of such recycled phosphoric acid is a significant factor in making the wet process commercially viable. The use of solely sulfuric acid for the digestion of phosphate rock, while possible, would be so expensive that the process would not be commercially viable.

In the following discussion of the invention and the wet process generally the concentration of calcium phosphate or phosphoric acid will be given in terms of $P_2O_5$ content.

The anhydrite process is generally conducted at a digestion temperature of about 130° C. and a stoichiometry that provides a concentration of $P_2O_5$ in the raw phosphoric acid product (phosphoric acid solution recovered as a filtrate, prior to any concentration process) of about 30 wt. percent. The hemihydrate process is generally conducted at a digestion temperature of about 90 to about 120° C. and a stoichiometry that provides a concentration of $P_2O_5$ in the raw phosphoric acid product of from about 30 to 45 wt. percent. The gypsum or dihydrate process is generally conducted at a digestion temperature of from about 70° to 80° C. and a stoichiometry that provides a concentration of $P_2O_5$ in the raw phosphoric acid product of from about 28 to about 30 wt. percent. The polymeric crystal modifier of the present invention is believed effective for any of these types of wet process phosphoric acid productions although the selection of polymer and the concentration thereof used for optimum results may vary from one process to the other. At reaction conditions between the above noted ranges the calcium sulfate by-product produced is a mixture For instance at 80°-90° C. a mixture of hemihydrate and dihydrate is formed; at 120°-130° C. hemihydrate and anhydrite is formed.

The digestion circuit of a commercial wet process phosphoric acid production plant generally employs a series of reaction vessels or attack tanks, and generally is operated as a continuous process. Such series may conveniently be designed so that material in the last or "end" tank may be recycled back to the first. For instance, the material discharged from the last tank would be "digested" slurry, that is, slurry in which the phosphate rock has been converted to phosphoric acid and calcium sulfate. Such digested slurry is in condition for filtration separation, but a portion of it is typically recycled back to the first tank to become the medium into which the sulfuric acid, recycled phosphoric acid, and the phosphate rock were added. At times the proportions between recycled digested slurry and digested slurry discharged to the filtration installation is dependent on the load the filtration installation can handle at that time. The sulfuric acid generally is charged to the series after the phosphate rock and its addition initiates the nucleation phase. The phosphate rock and recycled phosphoric acid may be added to the first, or the first and second tanks in the series, and the sulfuric acid to the following tank. The phosphate rock is digested, forming calcium sulfate and phosphoric acid. The material is circulated from tank to tank in the series. The portion of the digested slurry that is discharged to the filtration system is typically separated into phosphoric acid, recycled phosphoric acid, and calcium sulfate by-product as follows. Prayon filters are employed, which are large circular revolving filters. For instance, such a filter may be about 11 meters in diameter, and be revolving at a speed of 1 revolution per 3 minutes. The filter medium often used is a polypropylene filter cloth which extends over the surface. This is generally a vacuum filter operated at 12 to 15 inches of mercury atmosphere and is revolving continuously. The digested slurry is deposited at a station on one side of the filter and the filtrate from the vacuum filtration of just the slurry is collected as the raw phosphoric acid product. The filter cake from such filtered digested slurry then reaches another station at which it is washed with water. For instance, a countercurrent water flow may be used for such wash, and the wash water therefrom generally contains a sufficient amount of phosphoric acid to be used as the recycled phosphoric acid. The calcium sulfate by-product is then removed for either some other processing or is discarded. The calcium sulfate by-product is the major constituent of the filter cake after washing, but it is of course very desirable that any impurities be held within this filter cake. Such impurities generally are the components of the phosphate rock, other than the digested calcium phosphate, and any reaction products of such components. Such impurities include not only inorganic materials, but also the organic matter in the phosphate rock. The above description is an example of typical commercial wet process facility, and variations occur from plant to plant. At one commercial facility, a typical dwell time in the digestion circuit is about 6 hours, and digested slurry is discharged for filtration at a rate of about 1,500 gallons per minute from a digestion circuit processing about 220,000 gallons of material. Since the digestion of the phosphate rock is exothermic, any attack tank of commercial size would require cooling means to control the temperature to the desired level. Agitation is generally provided throughout the digestion circuit not only to assist the dissipation of heat but also to minimize any local high concentrations of $Ca^{+2}$ and $SO_4^{-2}$, which could form a precipitate on the surfaces of the phosphate rock particles and thus interfere with the digestion. The calcium sulfate crystals are nucleated and grown within this digestion circuit. Hence the crystal modifier of the present invention is added to the digestion circuit, preferably before the station at which the sulfuric acid is fed into the system. The nature of the crystals formed in the digestion circuit significantly affects the filtration process. Such effects include the time required for filtration of the digested slurry and time and effectiveness of the wash in removing residual phosphoric acid from the filter cake. The crystal formation within the digestion circuit is believed also to affect the degree of digestion, efficient crystal formation assisting in driving the reaction towards formation of phosphoric acid.

There are two major types of process losses, by virtue of which the potential yield of phosphoric acid is diminished. The first is a failure to fully decompose the tricalcium phosphate present in the phosphate rock. Such failure may be the result of insufficient reduction of particle size of the phosphate rock during the beneficiation steps or insufficient detention time in the digestion circuit. Failure to fully decompose the tricalcium phosphate may also occur when a portion of the phosphate rock in the digestion circuit becomes coated with calcium sulfate, for instance when an excessly high sulfate content in the reaction slurry converts the calcium ions to the calcium sulfate precipitate before such ions diffuse away from the rock-acid interface. The level of sulfate constituting such an excessly high concentration varies with the type of rock and other conditions, but generally is about a level of 1 to 4 weight percent of sulfuric acid. Incomplete decomposition of the tricalcium phosphate is thus generally minimized by operation parameters, including of course particle size of the phosphate rock, digestion circuit detention time, and reaction slurry sulfate content.

The second type of process loss by which the phosphoric acid yield is diminished is referred to as the presence of citrate soluble $P_2O_5$ in the washed calcium sulfate crystals This loss is believed to occur when dicalcium phosphate, $CaHPO_4.2H_2O$, is incorporated into the calcium sulfate crystal system. The higher the sulfate content of the solution, the less is such loss, and the higher the $P_2O_5$ content of the solution, the greater is such loss. This loss is greatest in solutions having a high concentration of calcium and a low concentration of sulfuric acid. To minimize such loss, an excess of $SO_4$ ions must be maintained through the entire digestion circuit.

The present invention has been found to improve the filtration of the digested slurry and increase the yield of the phosphoric acid produced. As to the filtration, the time required for filtering a given volume of filtrate, or a given volume of digested slurry, is decreased, and this phenomenon is believed to be due to the morphology of the crystals produced when the crystal modifier of the present invention is present at the nucleation phase of the digestion circuit. It is further believed that the filtration process is also improved by a better agglomeration of organic matter impurities throughout the filter cake when the present invention is used. The present invention also has been found to increase the yield of the phosphoric acid product, which generally is measured in terms of the phosphoric acid concentration of the filtrate. This increase in phosphoric acid product yield is believed due to an increase in the percent of phosphoric acid obtained by the digestion of the phosphate rock, but as to this and other advantageous phenomena the present invention is not limited to any specific theory attributable thereto.

In preferred embodiment the crystal modifier is a polymer containing from 5 to 50 mole percent of monomer units of the following Formula II:

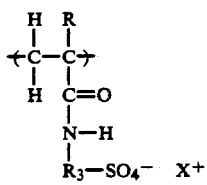

Formula II wherein R is hydrogen or methyl and $R_3$ is an aliphatic alkylene group having from 1 to 6 carbons, and $X^+$ is alkali metal, amine, or ammonium cation or other cation, and from 50 to 95 mole percent of monomer units of acrylamide or methacrylamide, that is, monomer units of the Formula I wherein both $R_1$ and $R_2$ are hydrogen. In further preferred embodiment the crystal modifier of the present invention is a polymer containing from about 10 to about 40 mole percent of 2-(meth)acrylamido2-methylpropylsulfonic acid (or salts thereof) monomer units and from 60 to 90 mole percent of (meth)acrylamide monomer units.

The reduced specific viscosities mentioned herein with respect to various polymers were determined using a 1 molar sodium nitrate solution solvent and a polymer concentration of 0.045 wt. percent. For the purposes of the present invention the polymeric crystal modifier should have a reduced specific viscosity of at least about 5, and an reasonable range with respect to reduced specific viscosity is from about 5 to about 30, which correlates approximately to a weight average molecular weight of from about 1,000,000 to about 10,000,000. It is believed the polymers having a weight average molecular weight of significantly less than 1,000,000 will not be effective crystal modifiers in the process of the present invention.

The amount of polymeric crystal modifier employed in the present invention for optimum results is believed to vary depending on the monomer units incorporated into the polymer, the mole ratio of various monomer units in the polymer, the polymer molecular weight, the type of wet process phosphoric acid production process in which it is used, and possibly other variables. It is believed that a concentration of polymeric crystal modifier of from about 0.1 to about 50 ppm in the slurry during the nucleation phase of the digestion circuit may be a reasonable overall range given the various possible combinations of factors affecting the polymeric crystal modifier concentration parameter. It is believed that the polymeric crystal modifier concentration suitable for the dihydrate process is from about 0.1 to about 25 ppm in the slurry during the nucleation phase of the digestion circuit, and in preferred embodiment from about 5 ppm to about 25 ppm, same basis. The concentration of the polymeric crystal modifier is defined herein generally in the level thereof in the slurry during the nucleation phase, and it should be understood that such concentration may not be present throughout the digestion circuit of a commercial facility. The polymeric crystal modifier may be added at various stations of the digestion circuit. For instance, it may be added together with the phosphate rock or it may be added with together with the sulfuric acid and recycled phosphoric acid, or at other stages, particularly where the commercial process is run as a continuous process. It is believed preferable to feed the polymeric crystal modifier at a station prior to the phosphate rock feed station, although in selecting the site of polymeric crystal feed one must consider the order in which other materials are fed, which may differ from one to another commercial facility. Particularly when the process is being run as a continuous process with recirculation of at least part of the digested slurry, the crystal modifier is fed in increments or continuously to maintain the desired concentration level at the nucleation phase, and hence the amount required to be fed at any time may be determined with reference to the amount of digested slurry that is being removed for filtration per unit time.

In another preferred embodiment the calcium sulfate crystals formed during the wet process are substantially at least about 40 microns long and at least about 10 microns wide, and in more preferred embodiment the crystal fines are at least adhered to, and more preferably fused to, crystals of such dimensions.

The polymers useful as polymeric crystal modifiers in the present invention are preferably prepared by water-in-oil emulsion polymerization techniques, wherein the resultant polymer is held within the dispersed water phase of an oil-external emulsion. Such water-in-oil emulsion polymerization techniques are capable of providing such polymers at sufficiently high weight average molecular weights for the present invention. Typically the polymers prepared by such techniques are added to an aqueous system, such as the aqueous slurry of the digestion circuit in the process of the present invention, as the water-in-oil emulsion to which has been added a surfactant to assist in the inversion of the emulsion upon its admixture with the aqueous system. Inversion of the emulsion brings the aqueous phase of the emulsion into contact with the water of the aqueous system and the water-soluble polymer within the emulsion's aqueous phase is thus released to the aqueous system. This method of introducing the polymeric crystal modifier is advantageous because the water-in-oil emulsion has a sufficiently low viscosity for ease in handling and the polymer is rapidly released and circulated throughout the aqueous system to which it is added. This does not exclude, however, the potential for introducing the polymer by other methods, such as for instance in a water solution. Such water-in-oil emulsion polymerization techniques and techniques for inverting the water-in-oil emulsion upon addition to an aqueous system to release the water-soluble polymer thereto are generally well known in the art.

Regardless of the manner in which the polymer comprising the crystal modifier of the present invention is introduced into the system, the dosage levels and/or concentration levels discussed herein are based on polymer actives unless expressly indicated otherwise.

In the foregoing embodiments of the polymeric crystal modifier of the present invention, the polymer may contain monomer units other than (meth)acrylamide and N-substituted sulfoalkyl(meth)acrylamide units, provided that such other units do not significantly diminish the anionic nature of the polymer nor significantly detract from the advantageous features of the present invention employing such polymers as crystal modifiers. Such additional monomer units may be units of acrylic acid, itaconic acid, t-butylacrylamide, alkyl esters of acrylic acid, methacrylic acid, alkyl esters of methacrylic acid, and other ethylenically-unsaturated monomers that may be copolymerizable with (meth)acrylamide and N-substituted sulfoalkyl(meth)acrylamide monomers, or with other monomers from which such (meth)acrylamide units and/or N-substituted sulfoalkyl(meth)acrylamide units may be derived, for instance, by a post-polymerization derivatization technique.

EXAMPLE 1

A polymeric crystal modifier within the present invention was added to the digestion circuit of a commercial wet process phosphoric acid production plant. The digestion temperature and stoichiometry of the plant were of the gypsum or dihydrate process type, and thus the calcium sulfate by-product produced was gysum crystals. The phosphoric acid production process was being run as a continuous process with a portion of the digested slurry being removed from the digestion circuit continuously for filtration. The portion of the slurry so removed is referred to as "filter feed slurry" and the rate at which it is removed from the digestion circuit and fed to the filtration means is referred to as "filter feed slurry feed rate". The effect of the crystal modifier was determined by determining periodically the $P_2O_5$ concentration of the raw phosphoric acid product being produced, the rate of production of raw phosphoric acid which is dependent on filtration rate, and the strength of the vacuum required for filtration (as inches mercury). Such periodic determinations were made hourly, beginning about one week before the polymeric crystal modifier feed commenced and continuing for five days thereafter. The results of such determinations are reported below as averages of these periodic determinations. The polymeric crystal modifier was fed into the digestion circuit at a rate to maintain a concentration thereof during the nucleation phase of from about 11 ppm to about 14 ppm. The crystal modifier feed rate required to maintain such level was generally determined with reference to the filter feed slurry feed rate. The results without the polymeric crystal modifier and with the polymeric crystal modifier are set forth below in Table I. The polymer is described further below.

TABLE I

| Parameter | Without Crystal Modifier | With Crystal Modifier | Variation With Crystal Modifier |
| --- | --- | --- | --- |
| $P_2O_5$ concentration of the raw phosphoric acid product (wt. %) | 26.5 | 27.5 | 4% increase |
| Production Rate in Tons per Day | 600 | 700 | 17% increase |
| Vacuum (" Hg) | 12 | 8 | 33% decrease |

The polymer employed as the polymeric crystal modifier was a copolymer of AcAm/AcAmPS having a respective mole ratio of monomer units of 65/35 and a reduced specific viscosity of from 14 to 18. Such copolymer is one of the preferred polymeric crystal modifiers for the gypsum process. The polymer was prepared using the water-in-oil emulsion polymerization technique and was employed in that form. The emulsion contained 27.7 wt. percent solids, which solids are substantially the polymer therein.

Simulated Process

Wet process phosphoric acid production was simulated in a 1.5 liter reaction vessel. The reaction vessel was equipped with a mechanical agitator, a thermometer, and gas sparge inlets. The mechanical agitator was a glass stirring rod with a 3 inch half-moon teflon agitator blade and a 2.5 inch six-vane stainless steel turbine set 1.5 inches under the surface of the slurry. External heating mantles were used when necessary to maintain the desired temperature. Various reactants are added to the reaction vessel to form a slurry, as described below, and the slurry is held in the reaction vessel at a temperature of 80° C. for a three hour period. Agitation is maintained throughout the process. The general formula for the slurry, excluding any additives, was:

| Water | 12.0 wt. percent |
| --- | --- |
| Recycled Acid | 42.0 wt. percent |
| Phosphate Rock | 25.0 wt. percent |
| Conc. $H_2SO_4$ | 21.0 wt. percent |

The "recycled acid" of the general formula above was a formulation simulating a typical commercial recycled phosphoric acid (secondary or wash filtrate from the filtration process). This recycled acid had the following composition:

| Water | 61.2 wt. percent |
| --- | --- |
| 85 wt. % $H_3PO_4$ | 35.7 wt. percent (22.0% $P_2O_5$) |
| Conc. $H_2SO_4$ | 3.1 wt. percent |

Based on the total slurry of the general formula, the recycled acid added thereto the following wt. percentages of its components:

| Water | 25.7 wt. percent |
| --- | --- |
| 85 wt. % $H_3PO_4$ | 15.0 wt. percent (9.2% $P_2O_5$) |
| Conc. $H_2SO_4$ | 3.1 wt. percent |
| Total | 42.0 wt. percent |

The phosphate rock used was dry rock. The water charge of the general formula was added to the reaction vessel with with one-half of the recycled acid charge and any additive employed. The other half of the recycled acid charge was mixed with the concentrated sulfuric acid charge of the general formula, and such mixing dissipates some of the heat of hydration before the sulfuric acid is added to the reaction vessel. The water, recycled acid, and additive, if any, initially charged to the reaction vessel were heated to 70° C. using external heating, and then the recycled acid/ sulfuric acid mixture was added to the reaction vessel in 10 ml. increments together with 20 gram increments of the phosphate rock, at a rate that provided a temperature within the reaction vessel of from 70 to 80° C. without any external heating. The reaction exotherm during such addition period held this elevated temperature. As noted above, after the addition of the sulfuric acid/recycled acid mixture and phosphate rock, the slurry is held at 80° C. using external heating as necessary, for a three hour period. The resultant digested slurry had a specific gravity of about 1.55. For a given additive, or no additive, the resultant digested slurry was reproducible as to the type of calcium sulfate crystals formed, the percent of phosphoric acid recovered, and the specific gravity of the phosphoric acid recovered. The conditions of this simulated process produced gypsum or calcium sulfate dihydrate. The phosphoric acid was recovered from a digested slurry by vacuum filtration (12 inches of mercury atmosphere) through a polypropylene filter cloth. Such vacuum filtration is continued for the time period required to dry the surface of the of the gypsum crystals, and then one minute further. The time period required for surface drying of the gypsum has been seen to vary from about 20 seconds to about 20 minutes. When the crystal formation is improved, the filtration is completed in less time than the blank, and conversely an additive with a deleterious effect on crystal formation will increase the filtration time in comparison to the blank. The recovered phosphoric acid is characterized in terms of the concentration of phosphoric acid (as wt. percent $P_2O_5$) in the filtrate and the specific gravity of such filtrate.

EXAMPLE 2

Using the simulated process described above, a series of digested slurries were produced. One slurry, a blank, was produced using no additive The other digested slurries were produced with the inclusion of a polymeric additive in the initial water/recycled acid charge to the reaction vessel. In all instances, except the blank, the amount of polymer added was 14 ppm based on total slurry (general formula) These polymers were homo- or copolymers of acrylamide ("AcAm") and 2-acrylamidomethylpropane sulfonic acid ("AcAmPS"), and are identified in Tables II and III below as to the mole percent of each monomer unit and as to the reduced specific viscosity ("RSV") of the polymer. Each of the digested slurries were filtered as described above for the simulated process and the phosphoric acid recovered. In Table II below, the filtration time required for each digested slurry is reported. In Table III the wt. percent of phosphoric acid in the filtrate, and the specific gravity of the filtrate is reported for each digested slurry.

TABLE II

| Polymer Additive | | | |
|---|---|---|---|
| Mole % AcAm | Mole % AcAmPS | Polymer RSV | Filtration Time (seconds) |
| — | — | — | 59 |
| 65 | 35 | 14–18 | 23 |

TABLE II-continued

| Polymer Additive | | | |
|---|---|---|---|
| Mole % AcAm | Mole % AcAmPS | Polymer RSV | Filtration Time (seconds) |
| 89 | 11 | 20–24 | 28 |
| 50 | 50 | 16–18 | 47 |
| 100 | 0 | 22–26 | 49 |
| 0 | 100 | 7–9 | 51 |
| 0 | 100 | 0.5 ± 0.1 | 53 |
| 25 | 75 | 11–13 | 54 |

As seen in Table II above, the AcAm/AcAmPS copolymers having mole percentages of 65/35 and 89/11 reduced the filtration time by more than fifty percent. The remainder of the polymers reduced the filtration time by about from 5 to 20 percent.

TABLE III

| Polymer Additive | | | Filtrate | |
|---|---|---|---|---|
| Mole % AcAm | Mole % AcAmPS | Polymer RSV | Wt. Percent $P_2O_5$ | Specific Gravity |
| — | — | — | 28.1 | 1.326 |
| 89 | 11 | 20–24 | 30.3 | 1.351 |
| 65 | 35 | 14–18 | 29.8 | 1.346 |
| 25 | 75 | 11–13 | 28.2 | 1.328 |
| 100 | 0 | 22–26 | 28.0 | 1.324 |
| 0 | 100 | 0.5 ± 0.1 | 27.8 | 1.323 |
| 50 | 50 | 16–18 | 27.6 | 1.320 |
| 0 | 100 | 7–9 | 27.4 | 1.317 |

As seen in Table III above, the AcAm/AcAmPS copolymers having mole percentage of 65/35 and 89/11 increased the recovery of phophoric acid by 6.0 and 7.8 percent,respectively, based on the increase in wt. percent $P_2O_5$ in the recovered filtrate. All polymers were added as water-in-oil emulsions, the polymer being held in the dispersed water phase, and the amount of the emulsion added was 50 ppm. Each emulsion contained 27.5 wt. percent solids, which solids are substantially the polymer solids.

EXAMPLE 3

Using the simulated process described above, the gypsum crystals produced when no crystal modifier was included in the digestion phase were compared to those produced when 60 ppm of a polymeric crystal modifier within the present invention was included in the digestion phase. The polymer was a copolymer of AcAm/AcAmPS with a mole percent ratio of 89/11 and a reduced specific viscosity of from 20 to 24. The comparison was made using SEM photomicrographs taken at 100× of the gypsum crystals produced The crystals produced without any additive were thin, needle-like crystals which are believed to be relatively fragile. The crystals produced in the presence of the AcAm/AcAmPS copolymers were significantly improved relative the blank as to crystal growth and agglomeration. The photomicrograph showed the presence of wide platelets with excellent particle agglomeration and excellent adherence of the small crystal fines to the larger crystals. A more specific analysis of these photomicrographs indicated that the crystals produced without any additive were 40 to 50 microns long and 3 to 5 microns wide, and were characterized as needles with a high fine content and no clusters As to the crystals produced in the presence of the AcAm/AcAmPS copolymer, they were 50 to 60 microns long and 20 to 25 microns wide, and were characterized as small plates and numerous clusters, with fines fused to larger particles.

EXAMPLE 4

Gypsum crystals produced as described above in Example 3, except a different crystal modifier was used, were also evaluated using a photomicrograph thereof. The crystal modifier used here was an AcAm/AMPS copolymer having a respective mole ratio of monomer units of 65/35 and a reduced specific viscosity of from 14 to 18. The polymer was employed at a concentration of 16.5 ppm based on total slurry. The crystals were characterized as being well defined plates, with some clusters, the fines not being fused. The crystals were from 60 to 70 microns long and from 20 to 30 microns wide.

Unless expressly stated otherwise herein, all percentages given above are weight percentages

INDUSTRIAL APPLICABILITY OF THE INVENTION

The present invention is applicable to the phosphoric acid production industry.

We claim:

1. A wet process phosphoric acid production process comprising the steps of digesting phosphate rock in a slurry containing sulfuric acid, whereby phosphoric acid is released and calcium sulfate crystals are formed, and then separating the phosphoric acid from the calcium sulfate crystals, the improvement comprising:

adding to said slurry, in an amount effective for calcium sulfate crystal formation improvement, a polymer containing monomer units of Formula I,

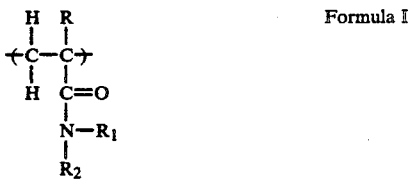

Formula I wherein R is hydrogen or methyl and $R_1$ and $R_2$ are independently hydrogen, alkyl or sulfoalkyl substituents;

wherein said polymer is comprised of monomer units of said Formula I wherein both of $R_1$ and $R_2$ are hydrogen and monomer units of said Formula I wherein one of said $R_1$ and $R_2$ is a sulfoalkyl substituents;

wherein said polymer is present at the calcium sulfate crystal nucleation phase of said digestion step; and wherein said polymer is added in a water-soluble salt form.

2. The process of claim 1 wherein the calcium sulfate crystals formed are calcium sulfate anhydrite crystals.

3. The process of claim 1 wherein the calcium sulfate crystals formed are calcium sulfate hemihydrate crystals.

4. The process of claim 1 wherein the calcium sulfate crystals formed are calcium sulfate dihydrate crystals.

5. The process of claim 1 wherein said polymer has a reduced specific viscosity of at least 5 when measured at 0.045 wt. percent polymer in 1 molar sodium nitrate solution.

6. The process of claim 5 wherein said polymer has a reduced specific viscosity of from about 5 to about when measured at 0.045 wt. percent polymer in 1 molar sodium nitrate solution.

7. The process of claim 1 wherein said polymer is comprised of from about 50 to about 95 mole percent of monomer units of (meth)acrylamide and from about 5 to 50 mole percent of monomer units of Formula II,

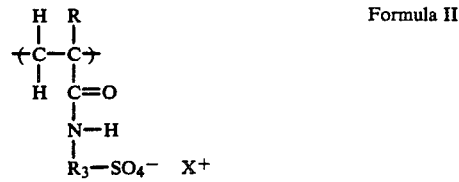

Formula II wherein R is hydrogen or methyl, and $R_3$ is an aliphatic alkylene group having from 1 to 6 carbons, and $X^+$ is an alkali metal, amine, or ammonium cation.

8. The process of claim 5 wherein said polymer is comprised of from about 10 to about 40 mole percent of 2-(meth)acrylamido-2-methylpropane sulfonic acid monomer units and from about 60 to about 90 mole percent of (meth)acrylamide monomer units and said polymer is in a water-soluble salt form.

9. The process of claim 8 wherein said polymer has a weight average molecular weight of from about 1,000,000 to about 10,000,000.

10. The process of claim 1 wherein said polymer is added to said slurry in an amount sufficient to provide a concentration of said polymer in said slurry during said nucleation phase of from about 0.1 to about 50 ppm.

11. The process of claim 8 wherein said polymer is added to said slurry in an amount sufficient to provide a concentration of said polymer in said slurry during said nucleation phase of from about 0.1 to about 25 ppm.

12. The process of claim 8 wherein said polymer is added to said slurry in an amount sufficient to provide a concentration of said polymer in said slurry during said nucleation phase of from about 5 to about 25 ppm.

13. The process of claim 1 wherein said polymer is added as a water-in-oil emulsion in which said polymer is substantially held within the dispersed water phase of said water-in-oil emulsion.

14. A wet process phosphoric acid production process comprising the steps of digesting phosphate rock in a slurry containing sulfuric acid, whereby phosphoric acid is released and calcium sulfate crystals are formed, and then separating the phosphoric acid from the calcium sulfate crystals, the improvement comprising;

adding to said slurry, in an amount effective for calcium sulfate crystal formation improvement, a polymer containing monomer units of Formula I,

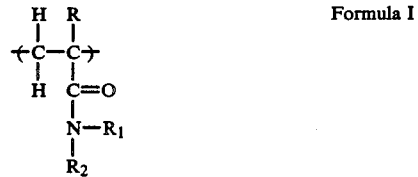

Formula I wherein R is hydrogen or methyl and $R_1$ and $R_2$ are independently hydrogen, alkyl or sulfoalkyl substituents;

wherein said polymer is comprised of monomer units of said Formula I wherein both of $R_1$ and $R_2$ are hydrogen and monomer units of said Formula I wherein one of said $R_1$ and $R_2$ is a sulfoalkyl substituent;

wherein said polymer is present at the calcium sulfate crystal nucleation phase of said digestion step;

wherein said polymer is added in a water-soluble salt form; and wherein said calcium sulfate crystals formed are substantially at least 40 microns long and at least 10 microns wide.

15. The process of claim 14 wherein any crystal fines are adhered to said crystals.

16. The process of claim 14 wherein said polymer has a reduced specific viscosity of from about 5 to about 30 when measured at 0.045 wt. percent polymer in 1 molar sodium nitrate solution.

17. The process of claim 14 wherein said polymer is comprised of from about 50 to about 95 mole percent of monomer units of (meth)acrylamide and from about 5 to 50 mole percent of monomer units of Formula II,

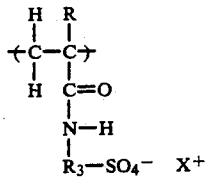

Formula II wherein R is hydrogen or methyl, and $R_3$ is an aliphatic alkylene group having from 1 to 6 carbons, and $X^{30}$ is an alkali metal, amine, or ammonium cation.

18. The process of claim 14 wherein said polymer is comprised of from about 10 to about 40 mole percent of 2-(meth)acrylamido-2-methylpropane sulfonic acid monomer units and from about 60 to about 90 mole percent of (meth)acrylamide monomer units and said polymer is in a water-soluble salt form.

19. The process of claim 14 wherein said polymer is added to said slurry in an amount sufficient to provide a concentration of said polymer in said slurry during said nucleation phase of from about 0.1 to about 50 ppm.

* * * * *

UNITED STATES PATENT AND TRADEMARK OFFICE
CERTIFICATE OF CORRECTION

PATENT NO. : 5,009,873
DATED : Apr. 23, 1991
INVENTOR(S) : E. Michael Kerr, et al.

It is certified that error appears in the above-identified patent and that said Letters Patent is hereby corrected as shown below:

In column 2, line 43, delete "H2O)" and substitute therefor -- $H_2O)$ --.

In column 2, line 48, delete "1½H$_2$" and substitute therefor -- 1½$H_2O$ --.

In column 11, line 68, which is Claim 6, line 2, after "5 to about", insert -- 30 --.

In column 14, line 11, which is Claim 17, second to the last line, delete "$X^{30}$" and substitute therefor --$X^+$--

Signed and Sealed this

Eleventh Day of August, 1992

Attest:

DOUGLAS B. COMER

*Attesting Officer*       *Acting Commissioner of Patents and Trademarks*